(12) United States Patent
Mei et al.

(10) Patent No.: US 11,662,617 B2
(45) Date of Patent: May 30, 2023

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Xindong Mei, Wuhan (CN); Shaojun Hou, Wuhan (CN); Chao Wang, Wuhan (CN); Guanghui Liu, Wuhan (CN); He Jiang, Wuhan (CN); Quan Tang, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 179 days.

(21) Appl. No.: 17/057,674

(22) PCT Filed: Aug. 26, 2020

(86) PCT No.: PCT/CN2020/111440
§ 371 (c)(1),
(2) Date: Nov. 22, 2020

(87) PCT Pub. No.: WO2022/007144
PCT Pub. Date: Jan. 13, 2022

(65) Prior Publication Data
US 2022/0155627 A1    May 19, 2022

(30) Foreign Application Priority Data

Jul. 8, 2020 (CN) .......................... 202010651627.9

(51) Int. Cl.
*G02F 1/1333* (2006.01)
*G06V 10/141* (2022.01)
(Continued)

(52) U.S. Cl.
CPC ....... *G02F 1/13338* (2013.01); *G02B 6/0051* (2013.01); *G02B 6/0053* (2013.01);
(Continued)

(58) Field of Classification Search
CPC ............. G02F 1/13338; G02F 1/13345; G02F 1/13312; G02F 1/1336; G02F 1/1333;
(Continued)

(56) References Cited

U.S. PATENT DOCUMENTS

2009/0059105 A1    3/2009 Colella

FOREIGN PATENT DOCUMENTS

CN        108885376 A    11/2018
CN        109190592 A    1/2019
(Continued)

*Primary Examiner* — Abhishek Sarma
(74) *Attorney, Agent, or Firm* — The Roy Gross Law Firm, LLC; Roy Gross

(57) ABSTRACT

A display panel is provided. The display panel comprises a display screen, a first backlight module, a second backlight module, and a fingerprint sensor, wherein the second backlight module has a fingerprint identification mode and a display mode. In the fingerprint identification mode, light reaches the fingerprint sensor through the second backlight module for fingerprint identification, and in the display mode, the first backlight module and the second backlight module provide uniform backlight to the display screen, thus realizing compatibility of functions of under-screen fingerprint identification and display.

11 Claims, 3 Drawing Sheets

(51) Int. Cl.
*G06V 40/13* (2022.01)
*G06V 10/145* (2022.01)
*F21V 8/00* (2006.01)
*G02F 1/1334* (2006.01)

(52) U.S. Cl.
CPC ......... *G02B 6/0055* (2013.01); *G06V 10/141* (2022.01); *G06V 10/145* (2022.01); *G06V 40/1318* (2022.01); *G02F 1/13345* (2021.01)

(58) Field of Classification Search
CPC ............. G02F 1/1334; G02F 1/133605; G02F 1/133606; G02F 1/13476; G02B 6/0051; G02B 6/0053; G02B 6/0055; G06V 10/141; G06V 10/145; G06V 40/1318; H04M 1/026; H04M 1/0266
See application file for complete search history.

(56) References Cited

FOREIGN PATENT DOCUMENTS

| | | |
|---|---|---|
| CN | 109541849 A | 3/2019 |
| CN | 110231735 A | 9/2019 |
| CN | 209707865 U | 11/2019 |
| CN | 210270454 U | 4/2020 |
| CN | 210428021 U | 4/2020 |
| CN | 111090184 A | 5/2020 |
| CN | 111352268 A | 6/2020 |
| CN | 210895487 U | 6/2020 |

DISPLAY PANEL AND DISPLAY DEVICE

CROSS REFERENCE TO RELATED APPLICATIONS

This application is a National Phase Entry of PCT/CN2020/111440 filed on Aug. 26, 2020 claiming priority to Chinese application 202010651627.9 filed Jul. 8, 2020. The contents of these applications are incorporated by reference in their entirety.

TECHNICAL FIELD

The present disclosure relates to the field of display technology, and in particular, to a display panel and a display device.

BACKGROUND

Fingerprint identification is widely used in portable electronic products. It can be used not only in screen unlocking, but also in handset payment, which increases use security. The traditional fingerprint recognition area is outside the screen. With the trend of a high screen occupation ratio, for a full screen with a screen occupation ratio of 100%, there is no area for fingerprint sensors in a front of a mobile phone. Therefore, under-screen fingerprint identification is a trend of fingerprint identification of mobile phones.

For an organic light-emitting diode (OLED) display device, due to its self-luminous characteristic and high transmittance of the light-emitting layer, it is easy to satisfy the conditions for fingerprint recognition and achieve under-screen fingerprint identification. However, for a liquid crystal display (LCD) device, due to a need of a backlight source which has lower brightness than that of a self-luminous OLED and the light passing through upper and lower polarizer and an LCD panel, its transmittance is too low to meet the requirements of optical fingerprint identification. Meanwhile, light reflected by a finger needs to pass through the backlight source to be received by the fingerprint sensor. However, the traditional backlight source reflects and scatters the light reflected by the finger, so that the fingerprint sensor cannot perceive the correct fingerprint information in the reflected light. Therefore, it is an urgent problem to be solved in this field to realize an LCD device compatible with functions of under-screen fingerprint identification and display.

SUMMARY

Embodiments of the present disclosure provide a display panel and a display device, which can realize compatibility of functions of under-screen fingerprint identification and display.

An embodiment of the present disclosure provides a display panel comprising: a display screen having a display surface and a non-display surface, and a fingerprint identification area and a non-fingerprint identification area outside the fingerprint identification area; a first backlight module disposed on the non-display surface and corresponding to the non-fingerprint identification area; a second backlight module disposed at a same side of the display screen with the first backlight module, connected to the first backlight module, and corresponding to the fingerprint identification area; and a fingerprint sensor disposed at a side of the second backlight module away from the display screen; wherein the second backlight module has a fingerprint identification mode and a display mode, in the fingerprint identification mode, light reaches the fingerprint sensor through the second backlight module for fingerprint identification, and in the display mode, the first backlight module and the second backlight module provide uniform backlight to the display screen.

In some embodiments, the first backlight module is disposed on the non-display surface and the second backlight module is disposed at a side of the first backlight module away from the non-display surface, or the second backlight module is disposed on the non-display surface and the first backlight module is disposed at a side of the second backlight module away from the non-display surface.

In some embodiments, when the second backlight module is disposed on the non-display surface and the first backlight module is disposed at the side of the second backlight module away from the non-display surface, the first backlight module is disposed as an integral structure.

In some embodiments, in the fingerprint identification mode, the second backlight module is in an opaque state and backlight provided by the second backlight module is fully reflected in the second backlight module, and in the display mode, the second backlight module is in a transparent state and the backlight provided by the second backlight module is uniformly scattered in the second backlight module as well as the first backlight module.

In some embodiments, the second backlight module comprises an optical element and a second light source, the optical element converts the fingerprint identification mode and the display mode under control of voltage, and the second light source is disposed on at least one side surface of the optical element.

In some embodiments, the optical element comprises a first display area and a second display area disposed around the first display area, in the fingerprint identification mode, light of the second light source is fully reflected in the first display area and uniformly scattered in the second display area, and in the display mode, the light of the second light source is uniformly scattered in the first display area and the second display area.

In some embodiments, the optical element comprises a first substrate and a second substrate disposed opposite to each other, and a sandwich material disposed between the first substrate and the second substrate, and the sandwich material is a material that can be converted into a transparent state or an opaque state under control of voltage.

In some embodiments, brightness of the second light source in the fingerprint identification mode is greater than the brightness of the second light source in the display mode.

In some embodiments, the first backlight module and the second backlight module are disposed on the non-display surface, and the first backlight module and the second backlight module are disposed on a same layer.

In some embodiments, the first backlight module comprises a prism plate, a diffusion plate, a light guide plate, a reflection plate, and a first light source, the prism plate, the diffusion plate, the light guide plate, the reflection plate, and the first light source are laminated in sequence along a direction away from the display screen, and the first light source is disposed on at least one side surface of the light guide plate.

In some embodiments, in the display mode, brightness of the first light source and the second light source is same.

An embodiment of the present disclosure provides a display device comprising a display panel. The display panel comprises: a display screen comprising a display surface and a non-display surface, and a fingerprint identification area and a non-fingerprint identification area outside the fingerprint identification area; a first backlight module disposed on the non-display surface and corresponding to the non-fingerprint identification area; a second backlight module disposed at a same side of the display screen with the first backlight module, connected to the first backlight module, and corresponding to the fingerprint identification area; and a fingerprint sensor disposed at a side of the second backlight module away from the display screen; wherein the second backlight module has a fingerprint identification mode and a display mode, in the fingerprint identification mode, light reaches the fingerprint sensor through the second backlight module for fingerprint identification, and in the display mode, the first backlight module and the second backlight module provide uniform backlight to the display screen.

In some embodiments, the first backlight module is disposed on the non-display surface and the second backlight module is disposed at a side of the first backlight module away from the non-display surface, or the second backlight module is disposed on the non-display surface and the first backlight module is disposed at a side of the second backlight module away from the non-display surface.

In some embodiments, the second backlight module comprises an optical element and a second light source, the optical element converts the fingerprint identification mode and the display mode under control of voltage, and the second light source is disposed on at least one side surface of the optical element.

In some embodiments, the optical element comprises a first display area and a second display area disposed around the first display area, in the fingerprint identification mode, light of the second light source is fully reflected in the first display area and the light of the second light source is uniformly scattered in the second display area, and in the display mode, the light of the second light source is uniformly scattered in the first display area and the second display area.

In some embodiments, the optical element comprises a first substrate and a second substrate disposed opposite to each other, and a sandwich material disposed between the first substrate and the second substrate, and the sandwich material is a material that can be converted into a transparent state or an opaque state under control of voltage.

In some embodiments, brightness of the second light source in the fingerprint identification mode is greater than the brightness of the second light source in the display mode.

In some embodiments, the first backlight module and the second backlight module are disposed on the non-display surface, and the first backlight module and the second backlight module are disposed on a same layer.

In some embodiments, the first backlight module comprises a prism plate, a diffusion plate, a light guide plate, a reflection plate, and a first light source, the prism plate, the diffusion plate, the light guide plate, the reflection plate, and the first light source are laminated along a direction away from the display screen in sequence, and the first light source is disposed on at least one side surface of the light guide plate.

In some embodiments, in the display mode, brightness of the first light source and the second light source is same.

The display panel provided in the embodiments of the present disclosure comprises a display screen, a first backlight module, a second backlight module, and a fingerprint sensor, wherein the second backlight module has a fingerprint identification mode and a display mode. In the fingerprint identification mode, light reaches the fingerprint sensor through the second backlight module for fingerprint identification, and in the display mode, the first backlight module and the second backlight module provide uniform backlight to the display screen. By setting the second backlight module, the display panel can realize compatibility of functions of under-screen fingerprint identification and display.

BRIEF DESCRIPTION OF DRAWINGS

To describe the technical solutions of the embodiments of the present disclosure more clearly, the following briefly introduces the accompanying drawings used in the description of the embodiments of the present disclosure. Apparently, the accompanying drawings described below illustrate only some exemplary embodiments of the present disclosure, and persons skilled in the art may derive other drawings from the drawings without making creative efforts.

DETAILED DESCRIPTION OF PREFERRED EMBODIMENTS

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure.

In description of the disclosure, it should be noted that orientational or positional relationships represented by directional terms mentioned in the present disclosure, such as, up, down, front, rear, left, right, inside, outside, etc., are orientational or positional relationships based on the drawings, and are merely for the convenience of describing the present disclosure and simplifying the description, rather than indicating or implying that the device or element is intended to have a particular orientation, or is constructed and operated in a particular orientation, and therefore, should not be interpreted as a limitation of the present disclosure.

Embodiments of the present disclosure provide a display panel, a manufacturing method of a display panel, and a display device. The display panel is described in detail as below.

Figure 1:
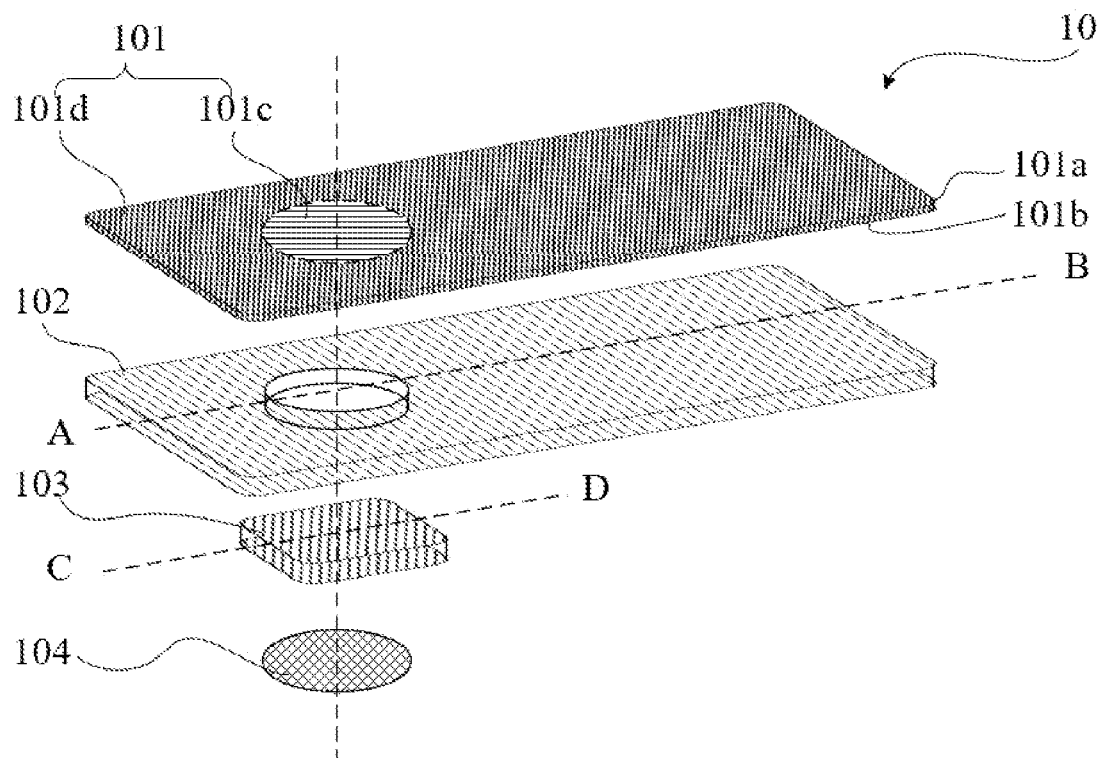
FIG. 1 is a structural schematic diagram illustrating a display panel provided in an embodiment of the present disclosure.

Please refer to FIG. 1 which is a structural schematic diagram illustrating the display panel 10 provided in an embodiment of the present disclosure. The display panel 10 comprises a display screen 101, a first backlight module 102, a second backlight module 103, and a fingerprint sensor 104. The display screen 101 has a display surface 101a and a non-display surface 101b, and a fingerprint identification area 101c and a non-fingerprint identification area 101d outside the fingerprint identification area 101c. The first backlight module 102 is disposed on the non-display surface 101b and corresponds to the non-fingerprint identification area 101d. The second backlight module 103 is disposed at a same side of the display screen 101 with the first backlight module 102, connected to the first backlight module 102 and corresponding to the fingerprint identification area 101c. The fingerprint sensor 104 is disposed at a side of the second backlight module 103 away from the display screen 101.

Wherein the display surface 101a is configured for image display, and the non-display surface 101b which is a surface opposite to the display surface 101a is not configured for image display. The fingerprint identification area 101c refers to an area where fingerprint information is collected during fingerprint identification, and the non-fingerprint identification area 101d refers to an area outside of the fingerprint identification area 101c of the display screen 101, which can still display images during fingerprint identification. For example, as shown in FIG. 1, the fingerprint identification area 101c is a circular area of the display screen 101, and an area of the display screen 101 except the circular area is the non-fingerprint identification area. In FIG. 1, it is exemplary to dispose the non-fingerprint identification area 101d around the fingerprint identification area 101c, which is not a limitation of a positional relationship between the fingerprint identification area 101c and the non-fingerprint identification area 101d and shapes thereof. Wherein the first backlight module 102 corresponds to the non-fingerprint identification area 101d, and the second backlight module 103 corresponds to the fingerprint identification area 101c. In detail, in the disposing method shown in FIG. 1, a position and a shape of the first backlight module 102 is exactly the same as those of the non-fingerprint identification area 101d. A position of the second backlight module 103 is the same as that of the fingerprint identification area 101c, but a shape of the second backlight module 103 is not exactly the same as that of the fingerprint identification area 101c. For example, edges of the second backlight module 103 can partially exceed edges of the fingerprint identification area 101C to achieve a seamless connection between the second backlight module 103 and the first backlight module 102 for better image display of a full screen. The fingerprint sensor 104 is disposed within or exactly corresponding to the fingerprint identification area 101c to improve efficiency of fingerprint identification.

Wherein the second backlight module 103 has a fingerprint identification mode and a display mode. In the fingerprint identification mode, light reaches the fingerprint sensor 104 through the second backlight module 103 for fingerprint identification, and in the display mode, the first backlight module 102 and the second backlight module 103 provide uniform backlight to the display screen 101.

In detail, in the fingerprint identification mode, the second backlight module 103 is in an opaque state, and backlight provided by the second backlight module 103 is fully reflected in the second backlight module 103. Therefore, the light reflected by a finger can pass through the second backlight module 103 to reach the fingerprint sensor 104 for fingerprint identification. In the display mode, the second backlight module 103 is in a transparent state, and the backlight provided by the second backlight module 103 is uniformly scattered in the second backlight module 103 as well as the first backlight module. Therefore, the first backlight module 102 and the second backlight module 103 provide uniform backlight to the display screen 101 to achieve full-screen display.

The display panel 10 provided in the embodiment of the present disclosure comprises the second backlight module 103 having the modes of fingerprint identification and display and disposed in the non-fingerprint identification area 101d. Light can pass through the second backlight module 103 in the fingerprint identification mode to reach the fingerprint sensor 104 for fingerprint identification. In the display mode, the first backlight module 102 and the second backlight module 103 provide uniform backlight to the display screen 101 to achieve full-screen display. Therefore, the display panel 10 provided in the embodiment of the present disclosure can be compatible with functions of under-screen fingerprint identification and display.

Figure 2:
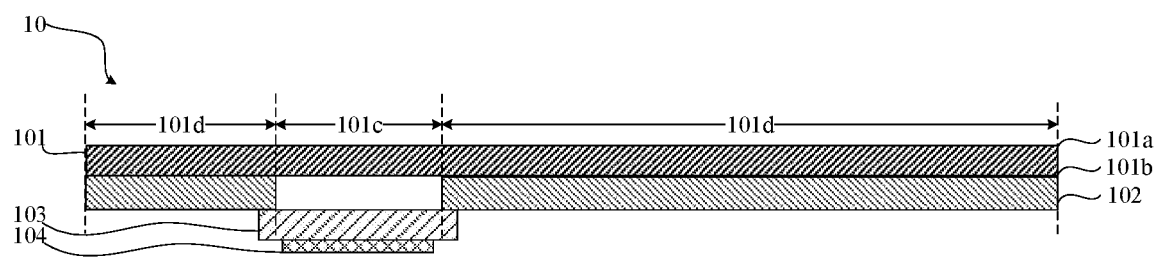
FIG. 2 is a schematic diagram illustrating a first section structure of a display panel provided in an embodiment of the present disclosure.

Please refer to FIG. 2 which is a schematic diagram illustrating a first section structure of a display panel 10 provided in an embodiment of the present disclosure. Wherein the first backlight module 102 is disposed on the non-display surface 101b, and the second backlight module 103 is disposed at a side of the display screen 101 away from the non-display surface 101b. The first backlight module 102 is disposed near the display screen 101, which reduces a loss of backlight of the first backlight module 102 during a transmitting process, improves utilization of light, and enables the display screen 101 to achieve a better display effect.

Figure 3:
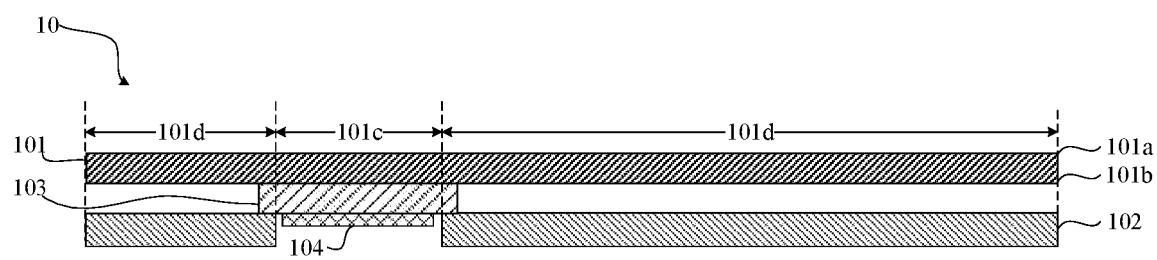
FIG. 3 is a schematic diagram illustrating a second section structure of a display panel provided in an embodiment of the present disclosure.

Please refer to FIG. 3 which is a schematic diagram illustrating a second section structure of a display panel 10 provided in an embodiment of the present disclosure. The second backlight module 103 is disposed on the non-display surface 101b, and the first backlight module 102 is disposed a side of the second backlight module 103 away from the non-display surface 101b. The second backlight module 103 is disposed near the display screen 101, which allows the fingerprint sensor 104 to better identify fingerprint signals to obtain more accurate identification results.

Wherein because the first backlight module 102 is disposed a side of the fingerprint sensor 104 away from the non-display surface 101b, the first backlight module 102 can be disposed as an integral structure (not shown in the accompany drawings), which does not affect fingerprint identification, but also provides backlight in the non-fingerprint identification area 101d. The first backlight module 102 can be disposed as an integral structure, which reduces process steps, reduces process difficulty, saves a production cost, and improves a production efficiency.

Figure 4:
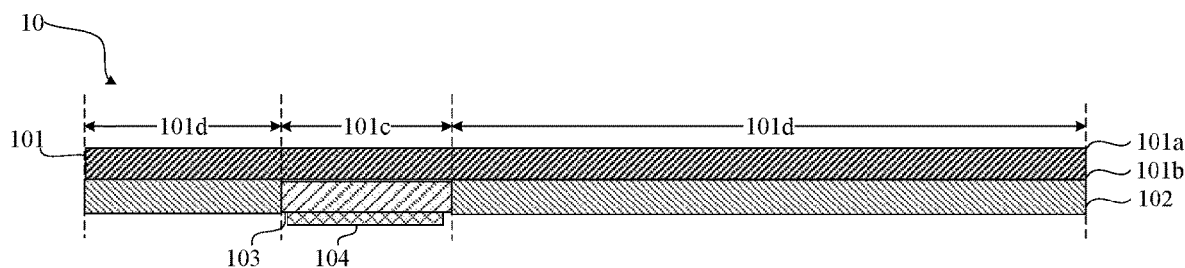
FIG. 4 is a schematic diagram illustrating a third section structure of a display panel provided in an embodiment of the present disclosure.

Please refer to FIG. 4 which is a schematic diagram illustrating a third section structure of a display panel 10 provided in an embodiment of the present disclosure. Wherein the first backlight module 102 and the second backlight module 103 are disposed on the non-display surface 101b and on a same layer. This arrangement enables the display screen 101 to get more uniform light in the display mode, thus achieving a better full-screen display effect.

Wherein when the fingerprint identification area 101c is located at an end or an edge (not shown in the accompany drawings) of the display screen 101, a position of the second backlight module 103 corresponding to the fingerprint identification area 101c can be disposed at an end of the first backlight module 102, thus reducing steps of a manufacturing process of the first backlight module 102. For example, the first backlight module 102 and the second backlight module 103 can be disposed on a same substrate, and the first backlight module 102 and the second backlight module 103 can be an integral structure through an integrated process, which simplifies a production process.

Figure 5:
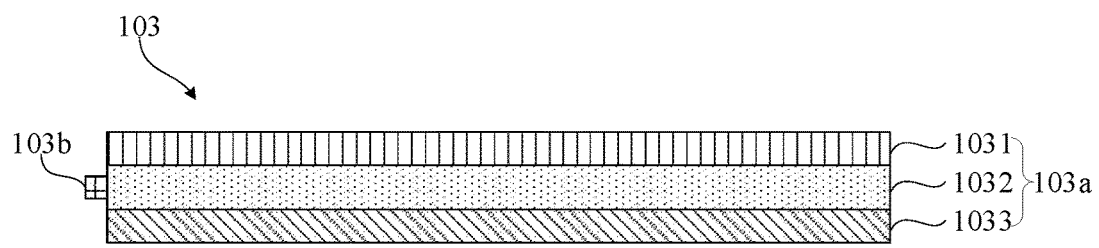
FIG. 5 is a schematic diagram illustrating a section structure taken along a line C-D of a second backlight module provided in an embodiment of the present disclosure.

Please refer to FIG. 5 which is a schematic diagram illustrating a section structure taken along a line C-D of a second backlight module 103 provided in an embodiment of the present disclosure. The second backlight module 103 comprises an optical element 103a and a second light source 103b, the optical element 103a converts the fingerprint identification mode and the display mode under control of voltage, and the second light source 103b is disposed on at least one side surface of the optical element 103a.

Wherein the second light source 103b is any one of light-emitting diodes, mini light-emitting diodes, and a small cold cathode fluorescent lamp, and the light-emitting diodes, the mini light-emitting diodes, or the small cold cathode fluorescent lamp constitutes a point light source or a line light source. The second light source 103b can be a visible light source or a combination of visible and infrared light. The light-emitting diodes or mini light-emitting diodes have a long service life, wherein the mini light-emitting diodes occupy a small volume and can be arranged on a side surface of the optical element 103a in quantity to make the light more uniform. The small cold cathode fluorescent lamp has high brightness, which can reduce an influence of a loss of transmitting light on the final display effect.

Wherein the optical element 103a comprises a first substrate 1031 and a second substrate 1033 disposed opposite to each other, and a sandwich material 1032 disposed between the first substrate 1031 and the second substrate 1033, and the sandwich material 1032 is a material that can be converted into a transparent state or an opaque state under control of voltage.

Wherein the first substrate 1031 and the second substrate 1033 are rigid substrates or flexible substrates. The first substrate 1031 and the second substrate 1033 are made of any one of glass, polyethylene terephthalate (PET) or polyimide (PI). Materials of the first substrate 1031 and the second substrate 1033 can be same or different, which can be arranged according to requirements of the display panel 10.

Wherein the sandwich material 1032 is polymer dispersed liquid crystals (PDLC) or polymer network liquid crystals (PNLC). The above materials can realize a change of transparent state and non-transparent state under voltage control. After the second backlight module 103 is connected to an integrated circuit by signal lines or a flexible circuit board, voltages in fingerprint identification mode and display mode are changed to change a state of the sandwich material 1032, so as to realize compatibility of functions of under-screen fingerprint identification and display.

In detail, in the fingerprint identification mode, the sandwich material 1032 is converted into the opaque state by control of voltage, and light of the second light source 103b is fully reflected within the optical element 103a. Therefore, light reflected by a finger reaches the fingerprint sensor 104 through the second backlight module 103 for fingerprint identification. In the display mode, the sandwich material 1032 is converted into the transparent state by control of voltage, and light of the second light source 103b is uniformly scattered within the optical element 103a. Therefore, the first backlight module 102 and the second backlight module 103 provide uniform backlight to the display screen 101 together to achieve full-screen display.

Wherein the optical element 103a comprises a first display area 103c and a second display area 103d disposed around the first display area 103c. The second display area 103d configured for uniformly scattering light is disposed around the first display area 103c to connect to the first backlight module 102, which can make displayed images corresponding to the first backlight module 102 and the second backlight module 103 seamlessly connect with each other.

Figure 6:
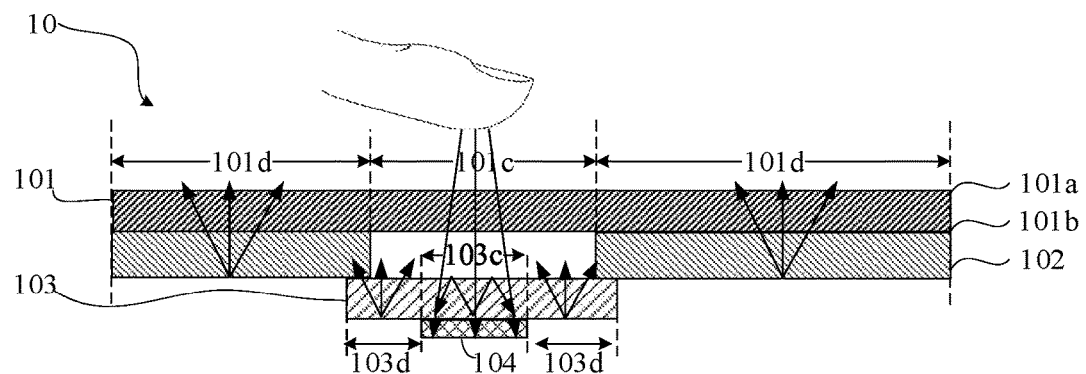
FIG. 6 is a schematic diagram illustrating an operating principle of a fingerprint identification mode provided in an embodiment of the present disclosure.

In detail, please refer to FIG. 6 which is a schematic diagram illustrating an operating principle of a fingerprint identification mode provided in an embodiment of the present disclosure. In the fingerprint identification mode, as shown in FIG. 6, light of the second light source 103b is fully reflected in the first display area 103c and uniformly scattered in the second display area 103d. Because backlight in the first display area 103c is fully reflected, light reflected by a finger can reach the fingerprint sensor 104 through the first display area 103c during fingerprint identification, so as to realize fingerprint identification.

Alternatively, in the fingerprint identification mode, the second light source 103b is controlled to turn off, and a state time of fingerprint identification is ensured to be very short, so that human eyes cannot recognize turn-off of the second light source 103b.

Figure 7:
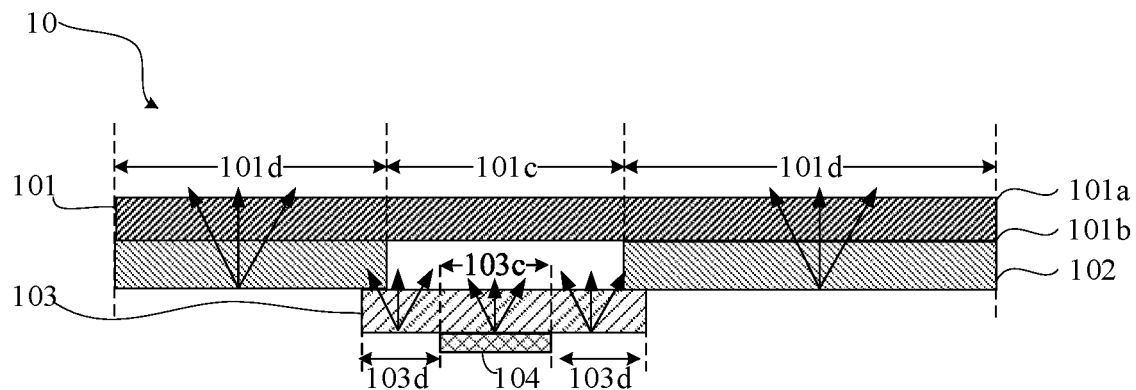
FIG. 7 is a schematic diagram illustrating an operating principle of a display mode provided in an embodiment of the present disclosure.

In detail, please refer to FIG. 7 which is schematic diagram illustrating an operating principle of a display mode provided in an embodiment of the present disclosure. In the display mode, light of the second light source 103d is uniformly scattered in the first display area 103c and the second display area 103d, to provide uniform backlight to the display screen 101 for image display.

Wherein brightness of the second light source 103b in the fingerprint identification mode is greater than the brightness of the second light source 103b in the display mode. In the fingerprint identification mode, the brightness of the second light source 103B is increased, which can improve a light intensity perceived by the fingerprint sensor, thus improves performance and accuracy of fingerprint identification.

Figure 8:
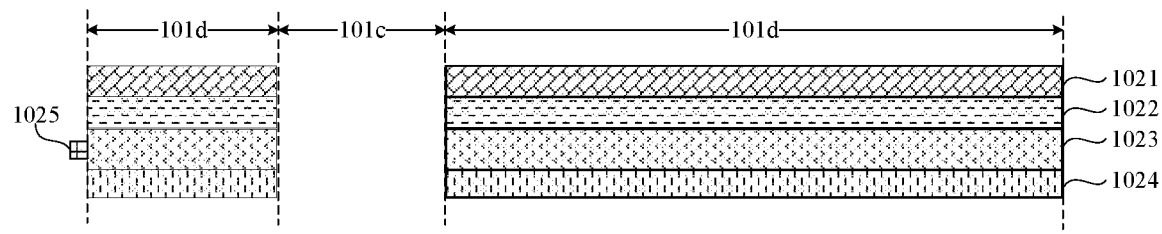
FIG. 8 is a schematic diagram illustrating a section structure taken along a line A-B of a first backlight module provided in an embodiment of the present disclosure.

Please refer to FIG. 8 which is a schematic diagram illustrating a section structure taken along a line A-B of a first backlight module provided in an embodiment of the present disclosure. The first backlight module 102 comprises a prism plate 1021, a diffusion plate 1022, a light guide plate 1023, a reflection plate 1024, and a first light source 1025. The prism plate 1021, the diffusion plate 1022, the light guide plate 1023, the reflection plate 1024, and the first light source 1025 are laminated along a direction away from the display screen 101, and the first light source 1025 is disposed on at least one side surface of the light guide plate 1023.

Wherein the prism plate 1021 is used to improve a luminous efficiency of the whole backlight system. The diffusion plate 1022 can be used to enhance optical quality and also to improve adsorption between the film and other parts of the display panel 10. The light guide plate 1023 is used to guide light of the first light source 1025, wherein the first light source 1025 is any one of light-emitting diodes, mini light-emitting diodes, and a small cold cathode fluorescent lamp, and the light guide plate 1023 converts a point light source of the light-emitting diodes or the mini light-emitting diodes to a surface light source and then provides uniform backlight to display screen 101. The reflection plate 1024 is used to control reflection and refraction of light, so that a path of light can be controlled, and brightness of the display panel 10 can be more uniform. Setting the above films can make the display panel 10 achieve a better display effect with lower power consumption.

Wherein the non-fingerprint identification area 101*d* as shown in FIG. 8 is disposed around the fingerprint identification area 101*c*, so the first backlight module 102 defines a hole in the fingerprint identification area 101*c* to leave the fingerprint identification area 101*c* open. In detail, the first backlight module 102 can define the hole in the fingerprint identification area 101*c* by a photoetching or an etching process. In addition, for the convenience of the manufacturing process, the first backlight module 102 can be disposed in the non-fingerprint identification area 101*d*, and a transparent substrate can be kept in the fingerprint identification area 101*c*. For example, the first backlight module 102 can be disposed in the non-fingerprint identification area 101*d* through a halftone mask process, as long as it does not affect transmitting of fingerprint identification signals.

Wherein in the display mode, brightness of the first light source 1025 and the second light source 103*b* is same. In the display mode, the brightness of the first light source 1025 is adjusted to the brightness of the second light source 103B to achieve a better display effect in order to achieve uniform display of the full screen.

Figure 9:
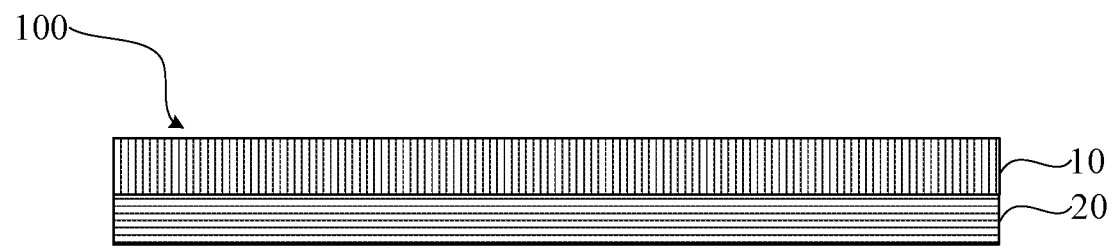
FIG. 9 is a structural schematic diagram illustrating a display device provided in an embodiment of the present disclosure.

An embodiment of the present disclosure provides a display device 100. FIG. 9 is a structural schematic diagram illustrating the display device 100 provided in an embodiment of the present disclosure. Wherein the display device 100 comprises the above display panel 10 and a circuit structure 20, and the display device 100 further comprises other units. The circuit structure 20, other units, and the assembly thereof in the embodiment of the present disclosure are relevant techniques familiar to the person skilled in the art, and details are not further described herein.

The display device 100 provided in the embodiment of the present disclosure comprises the display panel 10 and the circuit structure 20. In the display panel 10, the first backlight module 102 and the second backlight module 103 are disposed in the fingerprint identification area 101*c* and the non-fingerprint identification area 101*d* respectively, and different states of the second backlight module 103 are adjusted during the fingerprint identification mode and the display mode, to realize compatibility of functions of under-screen fingerprint identification and display.

The display panel and the display device provided in the embodiments of the present disclosure are described in detail above. The principle and implementations of the present disclosure are described in this specification by using specific examples. The description about the foregoing embodiments is merely provided to help understand the method and core ideas of the present disclosure. In addition, persons of ordinary skill in the art can make modifications in terms of the specific implementations and application scopes according to the ideas of the present disclosure. Therefore, the content of this specification shall not be construed as a limit to the present disclosure.

What is claimed is:

1. A display panel, comprising:
    a display screen having a display surface and a non-display surface, and a fingerprint identification area and a non-fingerprint identification area outside the fingerprint identification area;
    a first backlight module disposed on the non-display surface and corresponding to the non-fingerprint identification area;
    a second backlight module disposed at a same side of the display screen with the first backlight module, connected to the first backlight module, and corresponding to the fingerprint identification area; and
    a fingerprint sensor disposed at a side of the second backlight module away from the display screen;
    wherein the second backlight module has a fingerprint identification mode and a display mode, in the fingerprint identification mode, light reaches the fingerprint sensor through the second backlight module for fingerprint identification, and in the display mode, the first backlight module and the second backlight module provide uniform backlight to the display screen; the second backlight module comprises an optical element and a second light source, the optical element converts the fingerprint identification mode and the display mode under control of voltage, and the second light source is disposed on at least one side surface of the optical element.

2. The display panel as claimed in claim 1, wherein the first backlight module is disposed on the non-display surface and the second backlight module is disposed at a side of the first backlight module away from the non-display surface.

3. The display panel as claimed in claim 1, wherein in the fingerprint identification mode, the second backlight module is in an opaque state and backlight provided by the second backlight module is fully reflected in the second backlight module, and in the display mode, the second backlight module is in a transparent state and the backlight provided by the second backlight module is uniformly scattered in the second backlight module as well as the first backlight module.

4. The display panel as claimed in claim 1, wherein the optical element comprises a first display area and a second display area disposed around the first display area, in the fingerprint identification mode, light of the second light source is fully reflected in the first display area and uniformly scattered in the second display area, and in the display mode, the light of the second light source is uniformly scattered in the first display area and the second display area.

5. The display panel as claimed in claim 1, wherein the optical element comprises a first substrate and a second substrate disposed opposite to each other, and a sandwich material disposed between the first substrate and the second substrate, and the sandwich material is a material that can be converted into a transparent state or an opaque state under control of voltage.

6. The display panel as claimed in claim 1, wherein brightness of the second light source in the fingerprint identification mode is greater than the brightness of the second light source in the display mode.

7. A display device, comprising a display panel, and the display panel comprising:
    a display screen comprising a display surface and a non-display surface, and a fingerprint identification area and a non-fingerprint identification area outside the fingerprint identification area;

a first backlight module disposed on the non-display surface and corresponding to the non-fingerprint identification area;

a second backlight module disposed at a same side of the display screen with the first backlight module, connected to the first backlight module, and corresponding to the fingerprint identification area; and a fingerprint sensor disposed at a side of the second backlight module away from the display screen;

wherein the second backlight module has a fingerprint identification mode and a display mode, in the fingerprint identification mode, light reaches the fingerprint sensor through the second backlight module for fingerprint identification, and in the display mode, the first backlight module and the second backlight module provide uniform backlight to the display screen; the second backlight module comprises an optical element and a second light source, the optical element converts the fingerprint identification mode and the display mode under control of voltage, and the second light source is disposed on at least one side surface of the optical element.

8. The display device as claimed in claim 7, wherein the first backlight module is disposed on the non-display surface and the second backlight module is disposed at a side of the first backlight module away from the non-display surface.

9. The display device as claimed in claim 7, wherein the optical element comprises a first display area and a second display area disposed around the first display area, in the fingerprint identification mode, light of the second light source is fully reflected in the first display area and the light of the second light source is uniformly scattered in the second display area, and in the display mode, the light of the second light source is uniformly scattered in the first display area and the second display area.

10. The display device as claimed in claim 7, wherein the optical element comprises a first substrate and a second substrate disposed opposite to each other, and a sandwich material disposed between the first substrate and the second substrate, and the sandwich material is a material that can be converted into a transparent state or an opaque state under control of voltage.

11. The display device as claimed in claim 7, wherein brightness of the second light source in the fingerprint identification mode is greater than the brightness of the second light source in the display mode.

* * * * *